Sept. 30, 1969     D. J. B. BROWN     3,469,647

STEERABLE PLANETARY DRIVE WHEEL

Filed March 14, 1967     2 Sheets-Sheet 1

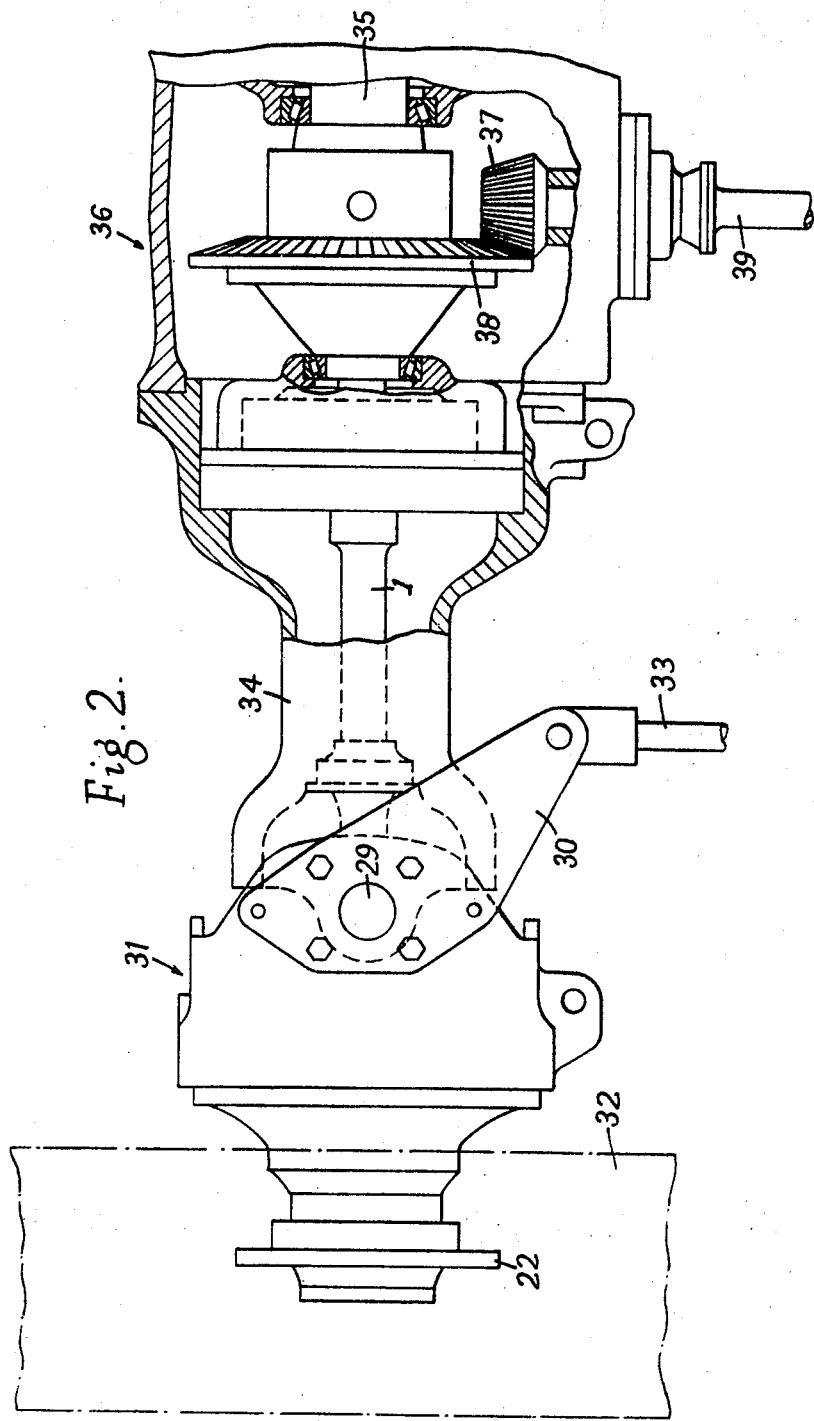

United States Patent Office 3,469,647
Patented Sept. 30, 1969

3,469,647
STEERABLE PLANETARY DRIVE WHEEL
David J. B. Brown, Stroud, England, assignor to Winget Limited, Rochester, Kent, England
Filed Mar. 14, 1967, Ser. No. 623,130
Claims priority, application Great Britain, Mar. 15, 1966, 11,284/66
Int. Cl. B62d 9/00, 7/18; B60k 17/80
U.S. Cl. 180—43                                5 Claims

ABSTRACT OF THE DISCLOSURE

A driving, steering axle comprises a constant velocity joint through which rotary power is supplied to an epicyclic gear from a drive shaft. The constant velocity joint is preferably attached to the sun wheel and the planet gears to drive a stub axle to which a wheel and its braking assembly may be attached.

---

Figure 1:
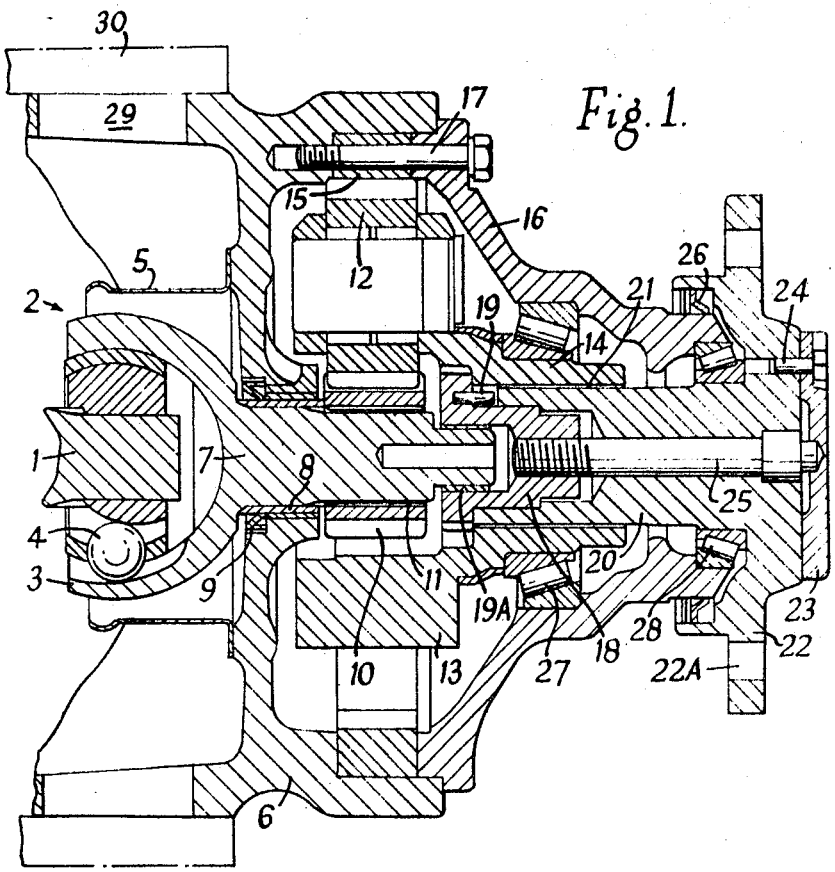

This invention relates to vehicle axles which provide for the transmission of rotary power from a prime mover to one or more wheels and also provide for the movement of the wheels to steer the vehicle. These axles will be referred to hereinafter as driving steering axles.

In driving steering axles of known types, it is normal practice to position the epicyclic gear train outboard of the brake drum and to drive from the epicyclic gear on to the brake drum through a ring gear, the brake drum being provided with flanges to which the wheel nave plate can be attached, this configuration leaving the major part of the epicyclic gearing housing protruding outwardly from the nave plate. Such an arrangement is cumbersome and is found in practice so place severe loading on the ring teeth and planet gear of the epicyclic gearing and also place uneven loading on the teeth. In addition, wheel bearings and oil seals are relatively large in relation to the loads carried.

The invention provides an improved driving, steering axle.

A driving, steering axle according to the invention has a first end adapted for the attachment of a wheel assembly and a second end adapted for the application of rotary power, and includes a constant velocity joint through which the rotary power is applied, an epicyclic reducing gear which connects the constant velocity joint with the second end and a steering point on the axle casing to which force may be applied to pivot the one end about the constant velocity joint.

The axle according to the invention allows a wheel and its associated braking system to be removed from the stub axle in a simple manner and permits disc brakes to be incorporated inboard of the constant velocity joint. It is also possible for wheels from driven and non-driven and steered and non-steered axles to be interchangeable because of the absence of a large hub protruding through the wheel nave plate. In the known axle the vehicle user may be required to remove the epicyclic gear and half shaft in order to reline the brakes or carry out maintenance thereto. This operation is time consuming and may damage the epicyclic gear and oil seals which would then require replacement. The gear and oil seals may have in consequence a relatively short life, and on agricultural tractors in particular, wheel interchangeability is limited due to the special form of wheel pressing required.

A driving steering axle may be designed according to the present invention with the epicyclic reduction gear located inboard of the wheel plate and the axle using relatively smaller wheel bearings and oil seals.

The constant velocity joint may have a shaft integral with its outer section which carries and rotates the sun wheel of the epicyclic gear. Attachment of the ring gear to the casing causes rotation of the planet wheel carrier when the sun wheel is rotated and the planet wheel carrier rotates a stub axle.

Figure 3:
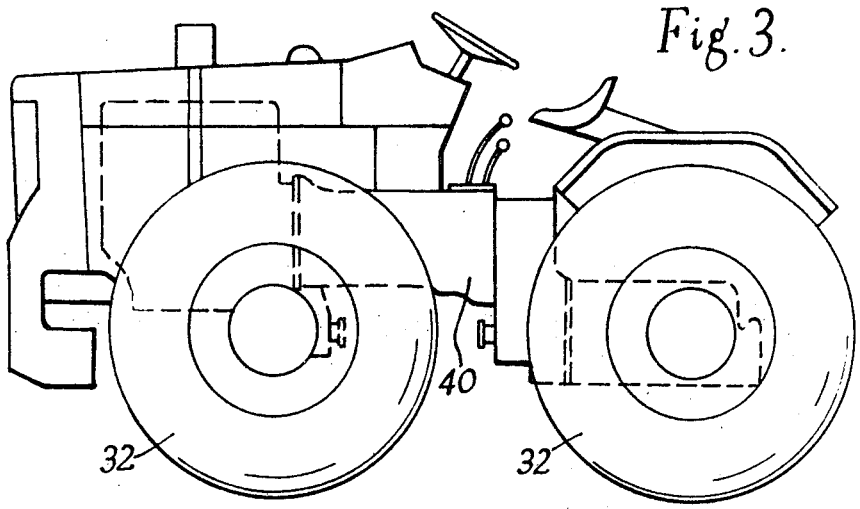

An embodiment of the driving, steering axle assembly according to the invention will now be described with reference to the accompanying diagrammatic drawings in which:

FIGURE 1 shows a sectional view of the axle assembly;
FIGURE 2 shows a partial sectional view from above showing the axle assembly with its associated power transmitting system and wheel;
FIGURE 3 shows a vehicle in which the axle assembly is used.

Referring now to FIGURE 1, a drive shaft 1, through which rotary power is applied to the assembly, is connected to a constant velocity joint 2 which includes a bell shaped joint part 3 and a ball race 4 within the housing 3. A flanged joint housing 5 extends over the constant velocity joint. The part 3 is integral with a shaft 7 which extends in a cover member 6 which supports the shaft 7 at a bearing sleeve 8. An oil seal 9 is positioned between the sleeve 9 and the cover member 6. A sun gear wheel 10 is positioned coaxially on the shaft 7 by means of splines 11 which cause the sun wheel to rotate with the shaft 7 and give it a degree of freedom which allows it to move axially along the shaft in particular installations. The sun wheel 10 meshes with planet wheels 12, only one of three wheels being shown, which are carried on a planet carrier 13. The planet carrier 13 is integral with a planet axle 14 extending from the sun and planet gear in a direction opposed to the shaft 7. The planet wheels 12 mesh with a ring gear 15 which is fixed in relation to the cover member 6. An outer casing 16 is attached to the cover member by means of a series of bolts 17 (only one of which is shown).

The planet axle 14 is splined onto a stub axle part 20 by a spline 21. The stub axle part 20 and the planet axle 14 together form the stub axle. The stub axle part 20 is dowelled by a dowel 19 to a bush housing 18 which rotates relative to the shaft 7 on a bush 19A. The axle part 20 and bush housing 18 are retained in attachment by a bolt 25 extending axially through the two components. The axle part 20 has an output flange 22 to which a brake assembly and wheel are bolted using a series of holes 22A. A hub assembly 23 is bolted to the axle part 20 by bolts 24.

The planet axle 14 and stub axle past 20 are supported in the outer casing by roller bearings 27 and 28, respectively, and an annular oil seal 26 is provided between the output flange 22 and the outer casing 16.

The cover member 6 extends over the constant velocity joint 2 and has apertures 29 for the reception of thrust pins carried on steering levers 30.

In operation the drive shaft 1 is rotated by power from the primer mover and the shaft 7 is rotated by power supplied through the constant velocity joint 2. The sun wheel 10 is rotated by its splined connection with the shaft 7 and, as the ring gear 15 is held fixed relative to the cover member, the planet wheels and hence the planet carrier 13 and the axle part 20 are rotated.

Referring now to FIGURE 2, the driving, steering axle described with reference to FIGURE 1 is indicated generally at 31 and is pivotable about thrust pins disposed in aperture 29 by the action of a steering rod 33 acting on the steering lever 30 with which it is pivoted. An assembly 32 of a wheel and associated braking system is attached to the flange 22. A half shaft 1 housed in a half shaft casing 34 supplies rotary power to the drive shaft 1 with which the constant velocity joint is splined.

The drive to the half shaft is obtained through a differential gear assembly 36 incorporating conventional bevelled pinion wheel 37 and crown wheel 38 from a propeller shaft 39.

A flexible dust cover (not shown) of corrugated frusto-conical shape may be secured between the cover member 6 and the half shaft casing 34 and by means of hose clips.

The steering rod 33 can be actuated by a conventional steering mechanism.

It will be appreciated that the shaft 39 also drives via an output shaft 35 an opposite hand and similar assembly to that shown on the other side of the differential assembly 38 of FIG. 2 so that a substantially symmetrical wheel driving and steering arrangement is obtained.

It will be evident that modifications can be made to the embodiment described thus the sun wheel 10 can be made integral with the axle 7 and not splined thereon. In this case the output axle 7 of the coupling 2 is blind bored and receives a flanged plug with a tie bolt adapted to hold the stub axle part 20 and on which the stub axle part can rotate when driven by the planet carrier. Alternatively the stub axle can be blind bored to receive the end of a flanged plug rotatably mounted on the end of a shaft extending from the axle 7.

In FIGURE 3 there is shown a general side view of a vehicle including a chassis 40 which carries wheel and brake assemblies 32 on driving steering axles according to the invention.

What is claimed is:

1. A driving and steering axle assembly for a wheeled vehicle comprising an axle housing having an inner casing member with means supporting said housing for pivotal movement about a pivot axis of a constant velocity universal joint and a separate, removable, outer casing member; a constant velocity universal joint having an integral joint axle extending into said housing and supported for rotation on an inner wall portion of said inner casing member; a wheel supportig drive axle mounted for rotation in said housing and supported adjacent its outer end in said outer casing member in coaxial alignment with and connected to the outer end of said joint axle; a planet carrier having a tubular outer end portion supported for rotation by said outer casing member and splined onto an inner end portion of said drive axle; a plurality of planet gears mounted on said carrier; ring gear means mounted in said axle housing between said inner and outer casing members in meshing engagement with said planet gears; and a sun gear splined onto said joint axle and having unrestrained axial movement thereon outwardly thereof and meshingly engaging said planet gears.

2. The driving and steering axle assembly of claim 1 wherein the connection between said wheel supporting drive axle and the outer end if said joint axle includes connector means mounted on the inner end of said drive axle and defining an axial bushing recess; said joint axle including a projection on the outer end extending into said bushing recess, and annular bushing means seated in said bushing recess and bearing against said projection of said joint axle.

3. The driving and steering axle assembly of claim 2 wherein said connector means includes an outer end portion extended into and seated in an axial recess formed in the inner end of said drive axle, and removable holding means accessible from the outer end of said drive axle for holding said connector means in seated engagement in said recess is said drive axle, said holding means being removable to permit outward withdrawal of said wheel axle from said housing away from said connector means.

4. The driving and steering axle assembly of said 3 including key means for interlocking said connector means and said drive axle against relative rotation when the former is seated in the axial recess of the latter.

5. The driving and steering axle assembly of claim 1 including first annular bearing means mounted in said inner wall portion of said inner casing member for rotatively supporting said joint axle, second bearing means mounted on said outer casing member rotatively supporting said tubular outer end portion of said planet carrier and third bearing means mounted in said outer casing member outwardly of said second bearing means for rotatively supporting said drive axle adjacent the outer end thereof.

References Cited

UNITED STATES PATENTS

| 2,776,583 | 1/1957 | Williams. |
| 2,801,702 | 8/1957 | Armington. |
| 2,998,735 | 9/1961 | Elfes. |

FOREIGN PATENTS

| 973,268 | 9/1950 | France. |

A. HARRY LEVY, Primary Examiner